(12) United States Patent
Kim et al.

(10) Patent No.: US 7,800,666 B2
(45) Date of Patent: Sep. 21, 2010

(54) COLOR FILTER ARRAYS COMPENSATING FOR WAVELENGTH OFFSET DUE TO CROSSTALK AND METHODS OF PRODUCING THE SAME

(75) Inventors: Jung-Yeon Kim, Busan (KR); Hiromichi Tanaka, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 304 days.

(21) Appl. No.: 11/896,789

(22) Filed: Sep. 6, 2007

(65) Prior Publication Data
US 2008/0129856 A1 Jun. 5, 2008

(30) Foreign Application Priority Data
Sep. 6, 2006 (KR) .............. 10-2006-0085867

(51) Int. Cl.
*H04N 5/335* (2006.01)
(52) U.S. Cl. .................................. 348/273
(58) Field of Classification Search ............ 348/268, 348/270, 272, 273, 280, 241, 248, 249, 250
See application file for complete search history.

(56) References Cited

U.S. PATENT DOCUMENTS

| | | | |
|---|---|---|---|
| 5,547,369 A * | 8/1996 | Sohma et al. | 431/75 |
| 5,703,641 A | 12/1997 | Watanabe | |
| 6,459,131 B1 | 10/2002 | Lee | |
| 7,456,878 B1 * | 11/2008 | Sun et al. | 348/241 |
| 2002/0085103 A1 * | 7/2002 | Kondo et al. | 348/273 |
| 2002/0181770 A1 * | 12/2002 | Jaspers | 382/167 |
| 2006/0103744 A1 | 5/2006 | Nam | |

FOREIGN PATENT DOCUMENTS

| | | |
|---|---|---|
| JP | 62-042449 | 2/1987 |
| JP | 03-096184 | 4/1991 |
| JP | 03-230101 | 10/1991 |
| JP | 07-274185 | 10/1995 |
| JP | 09-090118 | 4/1997 |
| JP | 2002-118246 | 4/2002 |
| JP | 2006-141039 | 6/2006 |
| KR | 10-0168451 | 10/1998 |
| KR | 1020020027016 A | 4/2002 |
| KR | 1020060053327 A | 5/2006 |

* cited by examiner

*Primary Examiner*—Jason Chan
*Assistant Examiner*—Nicholas G Giles
(74) *Attorney, Agent, or Firm*—Harness, Dickey & Pierce, P.L.C.

(57) ABSTRACT

A color filter array of a CMOS image sensor according to an example embodiment may include microlenses, color filters, and/or pixels. The microlenses may be configured to condense incident light. The color filters may be configured to extract colors from light passed through the microlenses. The pixels may be configured to receive colors from the color filters. The color filters may include yellow, green, and cyan filters. A transmission spectrum of select filters may be shifted to offset crosstalk effects from peripheral pixels based on a measured wavelength variation in each select pixel.

17 Claims, 11 Drawing Sheets

COLOR FILTER ARRAYS COMPENSATING FOR WAVELENGTH OFFSET DUE TO CROSSTALK AND METHODS OF PRODUCING THE SAME

PRIORITY STATEMENT

This application claims priority under 35 U.S.C. §119 to Korean Patent Application No. 2006-85867, filed on Sep. 6, 2006, the entire contents of which are hereby incorporated by reference.

BACKGROUND

Image sensors widely employed in digital cameras function to convert optical signals into electrical signals. This conversion process may occur in pixels of a complementary metal oxide semiconductor (CMOS) image sensor (CIS), each pixel including a photodiode and a read circuit. An image may be obtained by generating charges from light absorbed into the photodiode and converting those charges into voltage and current. During this procedure, since information about brightness may be identified from an image, color filters may be used to obtain color information about the image. To display hue, three distinct colors may be needed.

An image sensor for implementing a color image may include color filters over pixels (photosensitive devices) generating and accumulating photoelectrons in response to externally incident light. The color filters may include three components, for example, red, green, and blue filters, or yellow, magenta, and cyan filters.

If there are many pixels integrated in an image sensor for the purpose of obtaining a high-quality image, sensitivity may be reduced and crosstalk increased in the image sensor because of a smaller pixel size.

Crosstalk is an effect of changing the original spectrum characteristics and deteriorating color reproducibility because of interference between a color signal from one pixel and a color signal from another pixel.

From this reason, a color correction system may be employed to repair problems with degradation of sensitivity and increases in crosstalk in an image sensor. However, color correction systems may cause an increase in noise, decreasing a signal-to-noise ratio (SNR) or a rate of color reproduction.

SUMMARY

A color filter array of a CMOS image sensor according to an example embodiment may include microlenses, color filters, and/or pixels. The microlenses may be configured to condense incident light. The color filters may be configured to extract colors from light passed through the microlenses. The pixels may be configured to receive colors from the color filters. The color filters may include yellow, green, and cyan filters. The color filters may be disposed in a plurality of color filter units.

Each color filter unit may be divided into four sections with a first section including a yellow filter, a second section including a green filter, a third section including a cyan filter, and a fourth section including another green filter. Alternatively, the first section may include a green filter, the second section may include a cyan filter, the third section may include another green filter, and the fourth section may include a yellow filter. Also alternatively, the first section may include a cyan filter, the second section may include a green filter, the third section may include a yellow filter, and the fourth section may include another green filter. Also alternatively, the first section may include a green filter, the second section may include a yellow filter, the third section may include another green filter, and the fourth section may include a cyan filter.

A transmission spectrum of each yellow filter may be shifted to offset crosstalk effects from peripheral pixels based on a measured wavelength variation in each yellow pixel. The transmission spectrum of each yellow filter may be shifted using at least one compound with paints or dyestuffs.

Also, the transmission spectrum of each cyan filter may be shifted to offset crosstalk effects from peripheral pixels based on a measured wavelength variation in each cyan pixel. The transmission spectrum of each cyan filter may be shifted using at least one compound with paints or dyestuffs.

An image sensor may include a color filter array according to an example embodiment. A portable camera may include an image sensor including a color filter array according to an example embodiment.

According to another example embodiment, a method of producing a color filter array may include evaluating a received wavelength shift of a pixel due to crosstalk and/or adjusting a transmission spectrum of at least one color filter in the color filter array to offset the wavelength shift. Adjusting the transmission spectrum may include using at least one compound with paints or dyestuffs.

According to another example embodiment, a color filter array may include a plurality of color filters. Each color filter may be configured to compensate for a wavelength offset in a pixel due to crosstalk among adjacent pixels by shifting a transmission spectrum of incident light.

The transmission spectrum may be shifted using paints or dyestuffs. Each color filter may shift the transmission spectrum of incident light by an amount equal in magnitude but opposite in direction to the wavelength offset. The plurality of color filters may be arranged in overlapping units, each unit including green, yellow, and cyan color filters in a ratio of 2:1:1, respectively.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
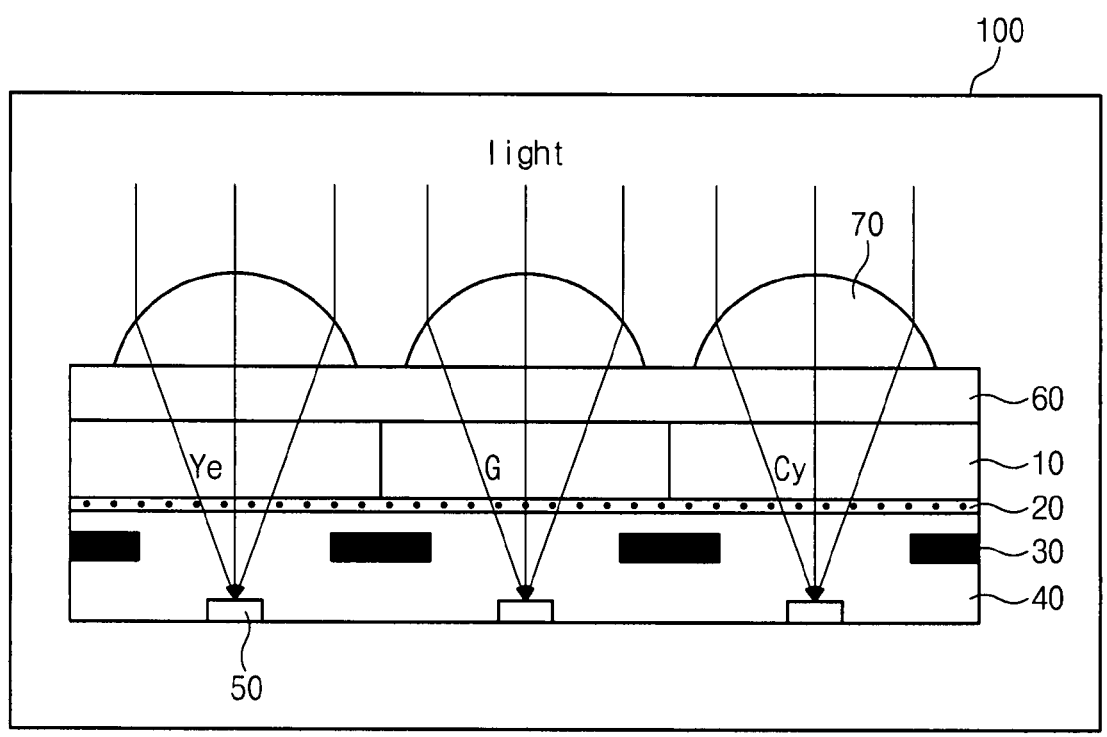
FIG. 1 is a sectional diagram of an example CMOS image censor (CIS) according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

In the figures, the dimensions of layers and regions may be exaggerated for clarity and/or illustration purposes. It will also be understood that when a layer (or film) is referred to as being 'on' another layer or substrate, it may be directly on the other layer or substrate, or intervening layers may also be present. Further, when a layer is referred to as being 'under' another layer, it may be directly under, and one or more intervening layers may also be present. In addition, when a layer is referred to as being 'between' two layers, it may be the only layer between the two layers, or one or more intervening layers may also be present.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to an example embodiment, a color filter array of a CMOS image sensor may use yellow (Ye), green (G), and/or cyan (Cy) filters. The color filter array may include relatively more green filters than other filters. This may help reduce or prevent degradation of color levels even with crosstalk in the image sensor.

FIG. 1 is a sectional diagram of a CMOS image censor according to an example embodiment. As shown, the image sensor 100 may include light shielding layers 30 in an interlayer film 40 to protect light from being incident on regions not part of photosensitive devices 50. Over the light shielding layers 30 may be a protection film 20. Color filters 10 may be arranged on the protection film 20. An over-coating material (OCM) layer 60 may be formed on the color filters 10 to provide manufacturing uniformity of microlenses 70 and/or adjustment of the focus ranges. The microlenses 70 may be formed on the OCM layer 60.

Figure 2:
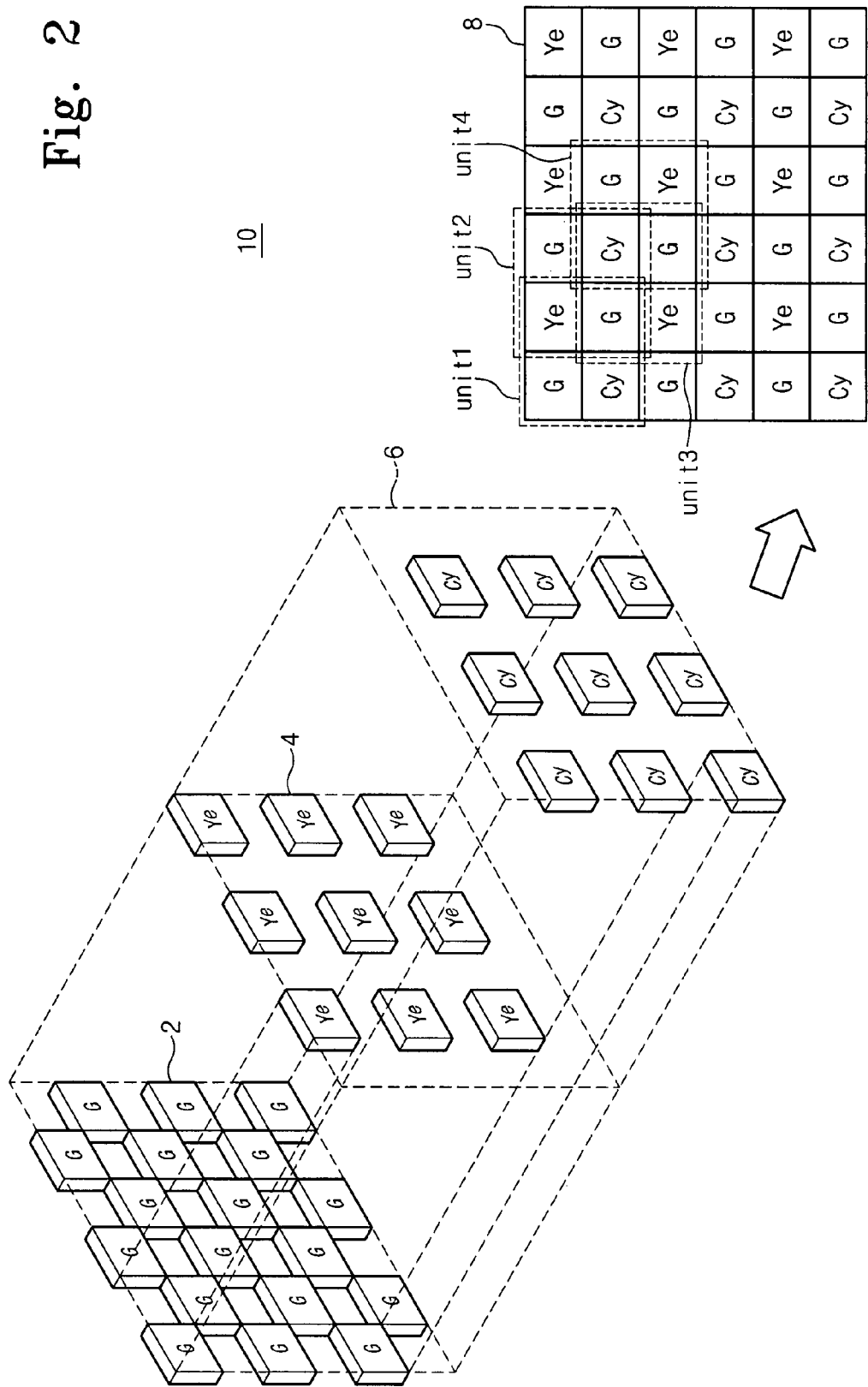
FIG. 2 is a diagram illustrating an example structure of the filter shown in FIG. 1.

FIG. 2 is a diagram illustrating an example structure of the filter shown in FIG. 1. As shown, there may be yellow, green, and cyan filters, which may offer improved performance characteristics over conventional red-green-blue (RGB) filters. The color filter array 8 may include yellow filters 4 and cyan filters 6 around green filters 2. The color filter array 8 may be composed of a number of color filter units unit 1-4. Each color filter unit 1-4 may be divided into distinct sections, each section including a color filter. For example, color filter unit 2 may be divided into four sections, the first section including a yellow color filter, the second section including a green filter, the third section including a cyan color filter, and the fourth section including another green filter. One of ordinary skill in the art will appreciate that the geometrical arrangement of the color filters with respect to one another is what is important, and the particular numbering scheme may be chosen arbitrarily.

Figure 3:
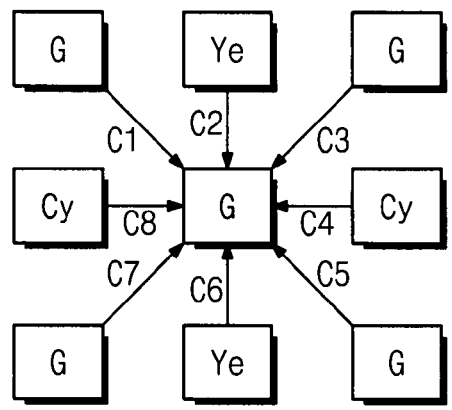
FIG. 3 is a diagram illustrating example pixels of color filters shown in FIG. 2, centering on a green (G) pixel.

FIG. 3 is a diagram illustrating example pixels of the color filters shown in FIG. 2, centering on a green (G) pixel. As shown in FIGS. 2 and 3, the green pixel may be affected by crosstalks from its left/right (left and right) cyan pixels, its up/down (up and down) yellow pixels, and/or its diagonal green pixels.

Crosstalk from the left/right cyan pixels, Cy", may be given by C4+C8 and crosstalk from the up/down yellow pixels, Ye", may be given by C2+C6. Crosstalk from diagonal green pixels, G", may be given by C1+C3+C5+C7.

In the description below, a green color passing through the green filter 2 may be represented as G, a yellow color passing through the yellow filter 4 may be represented as Ye, and a cyan color passing through the cyan filter 6 may be represented as Cy.

Because the crosstalk G" may contain many G-components with the same or similar spectrum characteristics, it may not vary significantly. The final green color G' may be produced from G+G"+Ye"+Cy" on the green pixel.

Figure 4:
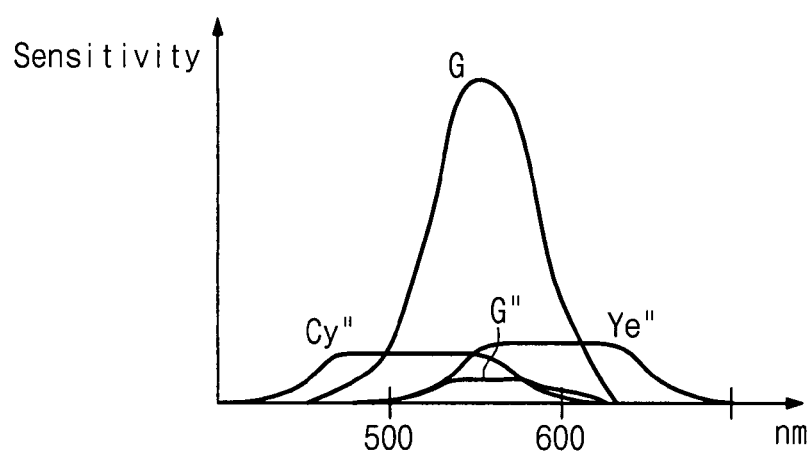
FIG. 4 is a graphic diagram illustrating the photosensitivity of the central G-pixel of FIG. 3 and the crosstalk Cy", G", and Ye".

FIG. 4 is a graphic diagram illustrating the photosensitivity of the central G-pixel of FIG. 3 and the crosstalks Cy", G", and Ye". As shown in FIG. 4, the crosstalk G" at the central G-pixel may have a substantially similar wavelength spectrum, albeit with decreased sensitivity, as the green color G. The crosstalks Cy" and Ye" by Cy- and Ye-pixels may substantially affect the G-pixel.

Figure 5:
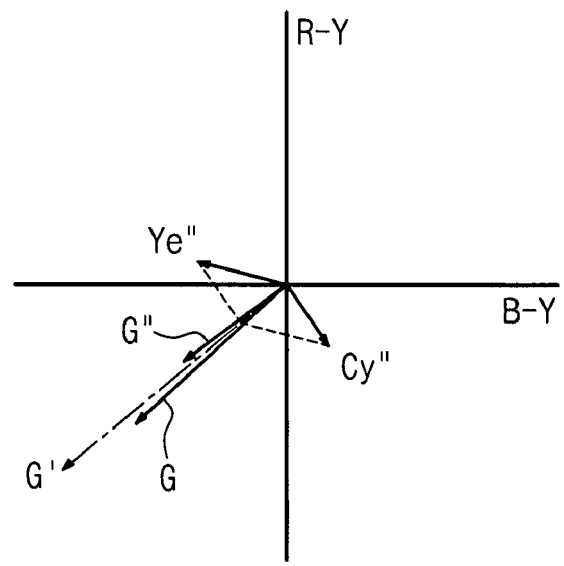
FIG. 5 is a graphic diagram illustrating a transformation of the graph of FIG. 4 onto the quarter plane of the R-Y and B-Y axes.

FIG. 5 is a graphic diagram illustrating a transformation of the graph of FIG. 4 onto the quarter plane of the R-Y and B-Y axes. As shown in FIG. 5, G' may be shifted in the direction of an increasing G-signal. Therefore, a signal-to-noise ratio (SNR) of the G-signal may actually be improved with respect to color reproduction without significant deterioration.

Figure 6:
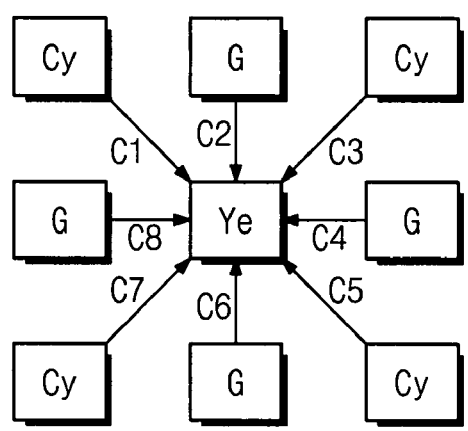
FIG. 6 is a diagram illustrating example pixels of color filters shown in FIG. 2, centering on a yellow (Ye) pixel.

FIG. 6 is a diagram illustrating example pixels of the color filters shown in FIG. 2, centering on an example yellow (Ye) pixel. As shown, the yellow pixel may receive crosstalks from its up/down and left/right green pixels and its diagonal cyan pixels.

Crosstalk from the left/right green pixels, G", may be given by C2+C4+C6+C8 and crosstalk from the diagonal cyan pixels, Cy", may be given by C1+C3+C5+C7. The final yellow color Ye' may be produced from Ye+G"+Cy" on the yellow pixel.

Figure 7:
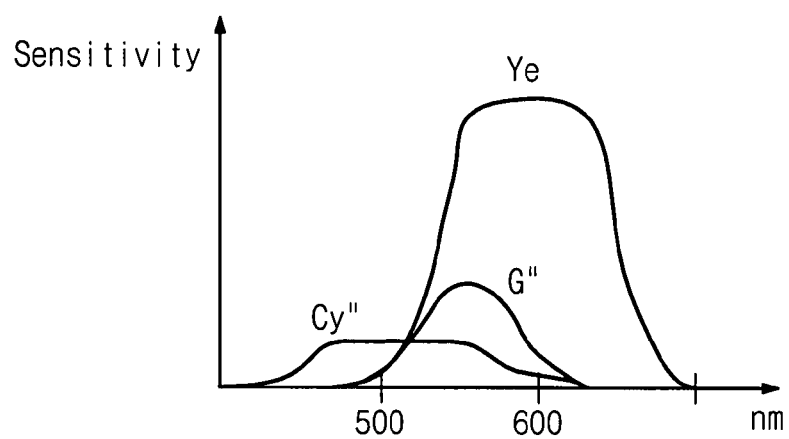
FIG. 7 is a graphic diagram illustrating the photosensitivity of the central Ye-pixel of FIG. 6 and crosstalk Cy" and G".

FIG. 7 is a graphic diagram illustrating the photosensitivity of the central Ye-pixel of FIG. 6 and crosstalks Cy" and G". As shown in FIG. 7, the crosstalk G" from the G-pixels may more strongly affect the Ye-pixel than the crosstalk Cy" from the Cy-pixels.

Figure 8:
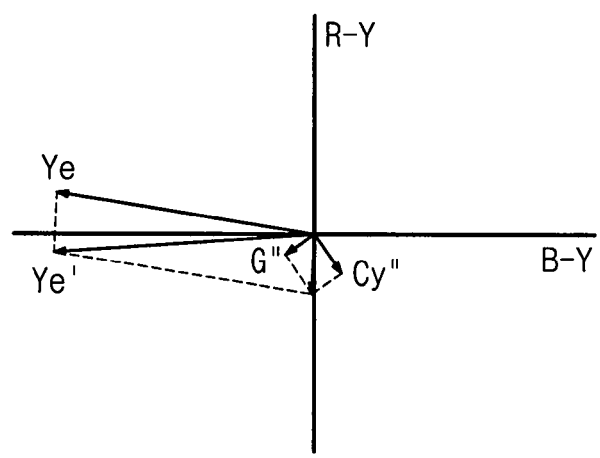
FIG. 8 is a graphic diagram illustrating a transformation of the graph of FIG. 7 onto the quarter plane of the R-Y and B-Y axes.

FIG. 8 is a graphic diagram illustrating a transformation of the graph of FIG. 7 onto the quarter plane of the R-Y and B-Y axes, in which the crosstalks G" and Cy" may shift the vector representation of Ye'. Therefore, it may be desirable to preliminarily shift the phase of the Ye-vector so that subsequent crosstalk effects may produce a shifted Ye'-vector more closely aligned with the desired Ye-vector.

Shifting the wavelength of incident light may be accomplished by compounding paints or dyestuffs used for generating color filters. For example, the peak wavelength of a red filter may be about 600 nm and the peak wavelength of a yellow filter may be about 550 nm. The yellow filter may be produced by shifting a short-side cutoff wavelength of the red filter toward the shorter wavelength direction by about 50 nm. The peak wavelength of the blue filter may be about 450 nm and the peak wavelength of the cyan filter may be 550 nm. The cyan filter may be produced by shifting a long-side cutoff wavelength of the blue filter toward the longer wavelength direction by about 100 nm.

Figure 9:
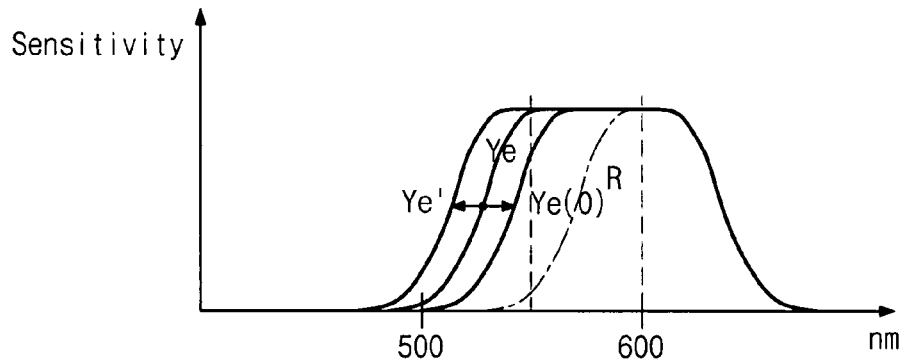
FIG. 9 is a graphic diagram illustrating photosensitivity characteristics of the red and yellow filters.

FIG. 9 is a graphic diagram illustrating photosensitivity characteristics of the red and yellow filters. As shown in FIG. 9, the yellow filter may be produced by shifting a short-side cutoff wavelength of the red filter toward the shorter wavelength direction by about 50 nm. Ye' may be shifted to the shorter wavelength by crosstalks from other peripheral pixels. Thus, a wavelength of Ye may be preliminarily shifted by the distance that the wavelength of Ye' moves due to crosstalk, thereby reducing or minimizing related crosstalk effects.

Figure 10:
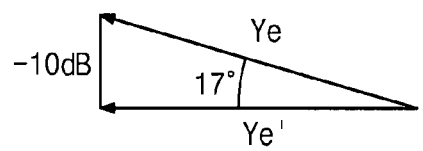
FIG. 10 is a diagram illustrating an example angular difference between the Ye-vector and Ye'-vector for crosstalk noise of approximately −10 dB.

FIG. 10 is a diagram illustrating an example angular difference between the Ye-vector and Ye'-vector for crosstalk noise of approximately −10 dB due to the Ye-pixel and other surrounding pixels. For the example crosstalk noise amount illustrated in FIG. 10 of approximately −10 dB, $-10\ dB = 10^{-1/2} \approx 0.3$; and $\tan^{-1} 0.3 \approx 17°$.

Therefore, the angular difference between the Ye-vector and Ye'-vector may be approximately 17°.

Figure 11:
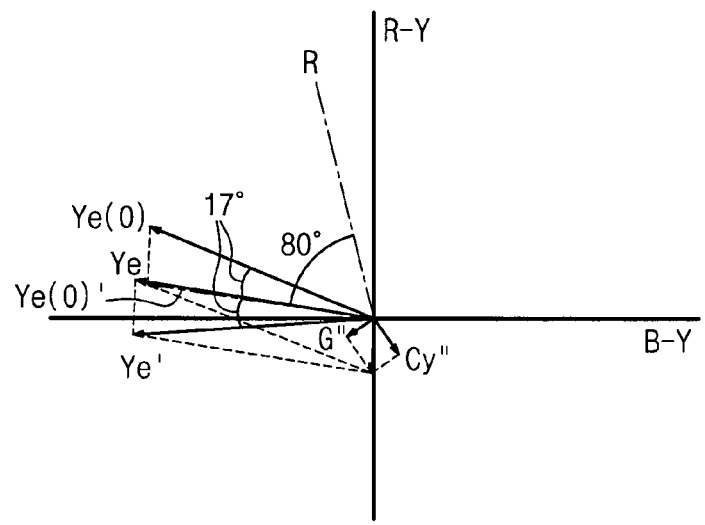
FIG. 11 is a graphic diagram illustrating Ye(0) shifted by 17° corresponding to an example angular difference between the Ye-vector and the Ye'-vector of FIG. 8.

FIG. 11 is a graphic diagram illustrating Ye(0) shifted by 17° corresponding to an example angular difference between the Ye-vector and the Ye'-vector of FIG. 8. As shown in FIGS. 10 and 11, for an angular difference of vectors between the red pixel R and the yellow pixel Ye of 80°, Ye(0) may be produced by shifting Ye in the red direction by the 17° corresponding to the angular difference between the Ye-vector and the Ye'-vector. Accordingly, instead of Ye' being shifted by 17° from Ye due to the crosstalk, Ye(0)' is shifted so as to be more similar to Ye.

Ye(0)' may represent a color filter, which may be a practically produced color, similar to Ye, produced by preliminarily adjusting a vector phase of Ye in the reverse direction of Ye' by the angular difference between vectors of Ye and Ye'. The color Ye(0)' produced from Ye(0) which may be made to prevent discoloration due to crosstalks may be similar to more pure Ye.

Calculating a shifted wavelength of Ye to Ye(0), $(600-550)*(17/80) \approx 10$ nm.

Figure 12:
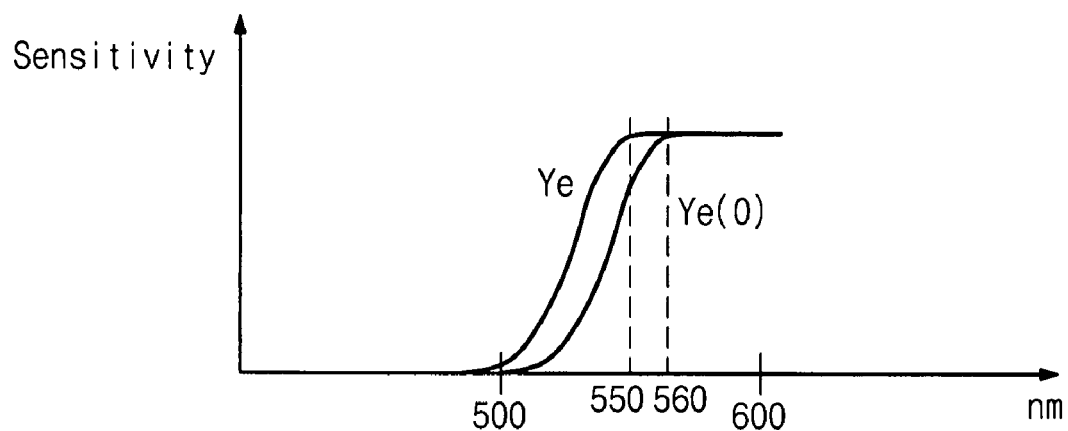
FIG. 12 is a graphic diagram illustrating Ye(0) made by shifting Ye of FIG. 8 in the longer wavelength direction by 10 nm.

FIG. 12 is a graphic diagram illustrating Ye(0) made by shifting Ye of FIG. 8 toward the longer wavelength direction by 10 nm. Ye(0) may be obtained by shifting Ye toward the longer wavelength direction in order to offset crosstalk due to peripheral pixels.

Figure 13:
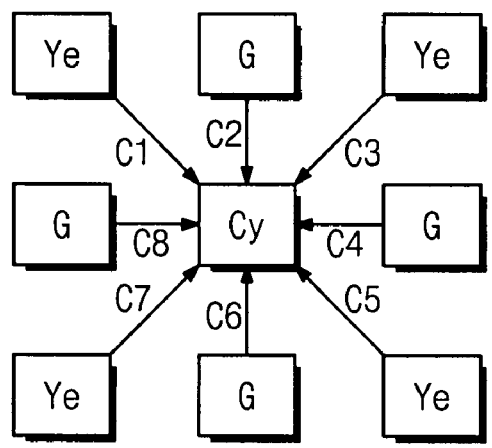
FIG. 13 is a diagram illustrating example pixels of color filters shown in FIG. 2, centering on a cyan (Cy) pixel.

FIG. 13 is a diagram illustrating example pixels of color filters shown in FIG. 2, centering on a cyan (Cy) pixel. According to FIG. 13, the cyan pixel may be affected with crosstalks from the up/down and left/right green pixels and the diagonal yellow pixels. The crosstalk from the up/down and left/right pixels, G", may be given by C2+C4+C6+C8 and the crosstalk from the diagonal yellow pixels, Ye", may be given by C1+C3+C5+C7. The final cyan color Cy' may be produced from Cy+G"+Ye" on the cyan pixel.

Figure 14:
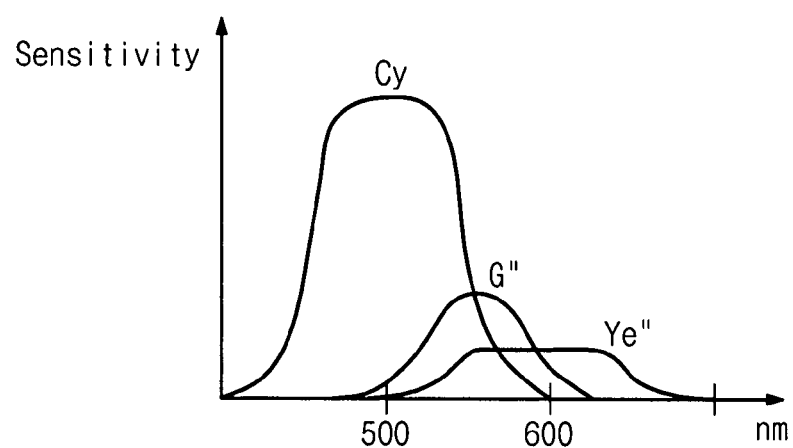
FIG. 14 is a graphic diagram illustrating the Cy-pixel shown in FIG. 13 and associated crosstalks G' and Ye".

FIG. 14 is a graphic diagram illustrating the Cy-pixel shown in FIG. 13 and associated crosstalks G' and Ye". According to FIG. 14, the crosstalk G" from G-pixels may more strongly affect the Cy-pixel than the crosstalk Ye" from Ye-pixels.

Figure 15:
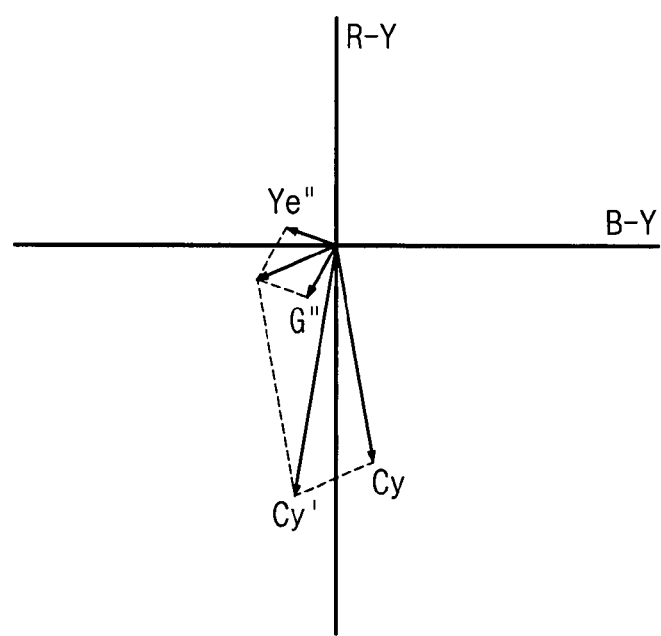
FIG. 15 is a graphic diagram illustrating a transformation of the graph of FIG. 14 onto the quarter plane of the R-Y and B-Y axes.

FIG. 15 is a graphic diagram illustrating a transformation of the graph of FIG. 14 onto the quarter plane of the R-Y and B-Y axes. According to FIG. 15, the crosstalks G" and Ye" may affect the Cy'-vector. Therefore, it may be desirable to preliminarily shift the phase of the Cy-vector so that subsequent crosstalk effects may produce a shifted Cy'-vector more closely aligned with the desired Cy-vector.

Figure 16:
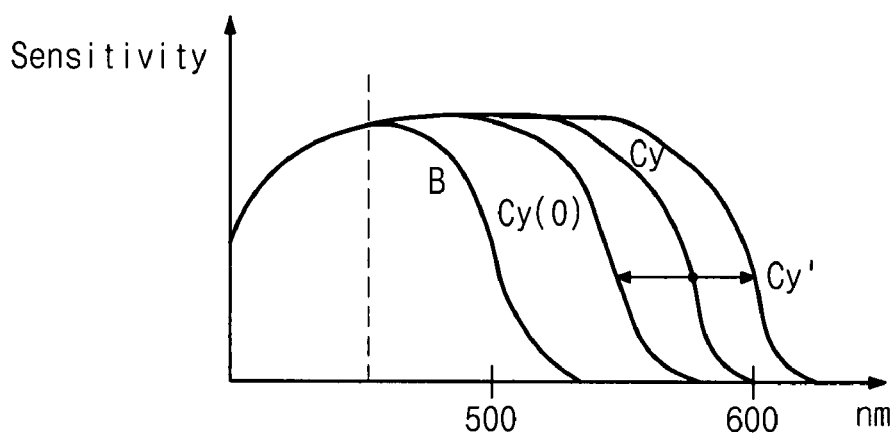
FIG. 16 is a graphic diagram illustrating photosensitivity characteristics of blue and cyan filters.

FIG. 16 is a graphic diagram illustrating photosensitivity characteristics of the blue and cyan filters. According to FIG. 16, the cyan filter may be produced by shifting a long-side cutoff wavelength of the blue filter toward the longer wavelength direction by about 100 nm. Cy' may be shifted to the longer wavelength by crosstalk from other peripheral pixels. Thus, a wavelength of Cy may be preliminarily shifted by the distance that a wavelength of Cy' moves, thereby reducing or minimizing crosstalk effects.

Figure 17:
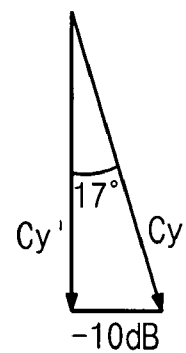
FIG. 17 is a diagram illustrating an example angular difference between a Cy-vector and Cy'-vector when noise due to crosstalk is approximately −10 dB.

FIG. 17 is a diagram illustrating an example angular difference between a Cy-vector and Cy'-vector when the noise due to crosstalk from a Cy-pixel and other pixels around the Cy-pixel is approximately −10 dB. For the example crosstalk of FIG. 17 of approximately −10 dB, $$-10\ dB = 10^{-1/2} \approx 0.3;\ \text{and}$$

$$\tan^{-1} 0.3 \approx 17°.$$

Therefore, the angular difference of vectors between Cy and Cy' may be approximately 17°.

Figure 18:
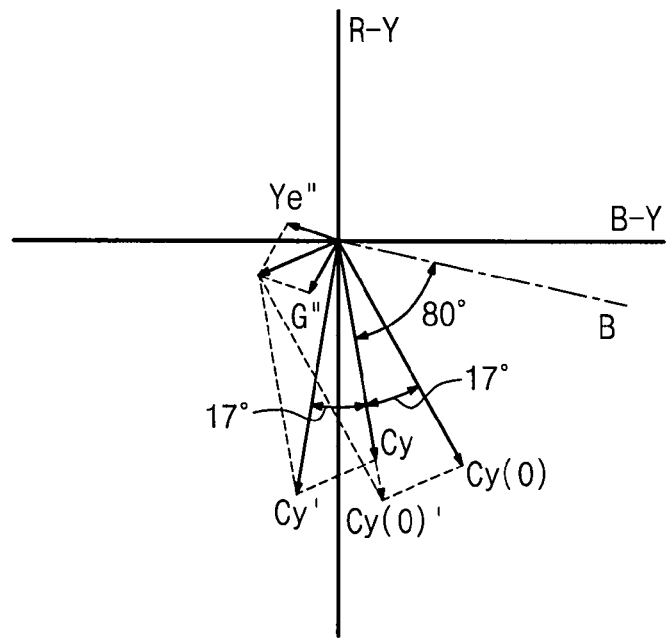
FIG. 18 is a graphic diagram showing Cy(0) shifted by 17° corresponding to the example angular difference between the Cy-vector and Cy'-vector shown in FIG. 15.

FIG. 18 is a graphic diagram showing Cy(0) shifted by 17° corresponding to the above example angular difference between the Cy-vector and Cy'-vector shown in FIG. 15. According to FIG. 18, for an angular difference between vectors of the blue pixel B and the cyan pixel Cy of 80°, Cy(0) may be produced by shifting Cy to the red direction by the 17° corresponding to the angular difference of vectors between Cy and Cy'. Accordingly, instead of Cy' being shifted by 17° from Cy due to crosstalk, Cy(0)' may be shifted to a position closer to that of Cy.

Cy(0)' may represent a color filter, which may be a practically produced color, similar to Cy, produced by preliminarily changing a vector phase of Cy in the reverse direction of Cy' by the angular difference between vectors of Cy and Cy'. The color Cy(0)' may be produced from Cy(0) to prevent discoloration due to crosstalk, and may be similar to pure Cy.

Calculating the wavelength shifted by 17° from Cy due to the crosstalk, $$(550-450)*(17/80) \approx 20\ nm.$$

Figure 19:
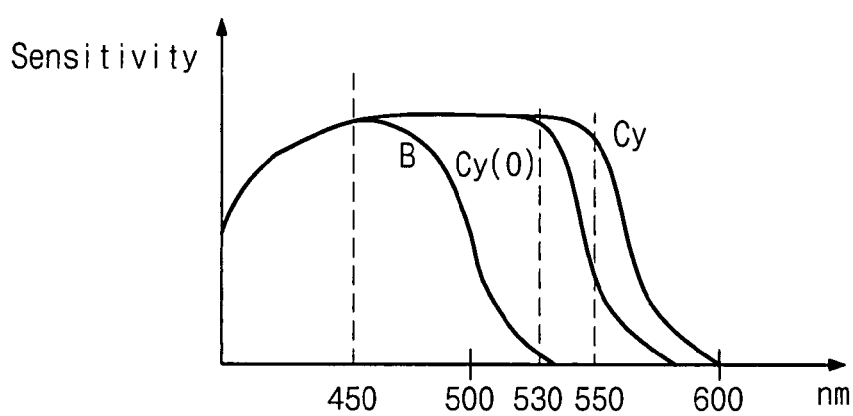
FIG. 19 is a graphic diagram illustrating Cy(0) made by shifting Cy of FIG. 15 in the shorter wavelength direction by 20 nm.

FIG. 19 is a graphic diagram illustrating Cy(0) made by shifting Cy of FIG. 15 in the shorter wavelength direction by 20 nm. According to FIG. 19, Cy(0) may be obtained by shifting Cy toward the long wavelength direction in order to offset crosstalk due to peripheral pixels.

As discussed above, the green pixels may be relatively less affected by crosstalk from peripheral pixels as compared to the yellow and cyan pixels. The yellow pixels may be affected by the crosstalk G" from G-pixels, as shown in FIG. 7. Thus, wavelengths of the yellow filter may be adjusted to offset crosstalk G" effects. The cyan pixel may also be affected by the crosstalk G" from G-pixels, as shown in FIG. 14. Thus, wavelengths of the cyan filter may also be adjusted to offset crosstalk G" effects.

The yellow and cyan pixels may be offset with regards to the effects of crosstalk. When optical signals from the yellow, green, and cyan filters are converted into RGB signals, a red signal may be obtained by subtracting a green signal from a yellow signal, and a blue signal may be obtained by subtracting a green signal from a cyan signal. The red R', blue B', and green G' signals may be given by the set of equations in Equation 1. As may be seen from the equations, a green pixel of the RGB filter may be the same as that obtained from the yellow, green, and cyan filters.

$$R' = Ye - G$$

$$G' = G$$

$$B' = Cy - G \qquad \text{[Equation 1]}$$

$$\begin{pmatrix} R' \\ G' \\ B' \end{pmatrix} = \begin{pmatrix} 1.0 & -1.0 & 0 \\ 0 & 1.0 & 0 \\ 0 & -1.0 & 1.0 \end{pmatrix} \begin{pmatrix} R \\ G \\ B \end{pmatrix} \qquad \text{[Equation 2]}$$

Equation 2 is a matrix transformation representation of the set of equations in Equation 1. The diagonal components of the matrix, noted by a broken line, may be used to estimate dispersion of noises. If noises become larger (i.e., if coefficients of the matrix become larger), an SNR may be degraded. However, noises of Equation 2 are all 1, and thus, the color signals may be relatively unaffected by noise.

$$\begin{pmatrix} R' \\ G' \\ B' \end{pmatrix} = \begin{pmatrix} 1.5 & -1.5 & 0 \\ -0.5 & 1.6 & -0.3 \\ -0.3 & -0.7 & 2.0 \end{pmatrix} \begin{pmatrix} R \\ G \\ B \end{pmatrix} \qquad \text{[Equation 3]}$$

When using the RGB filter, the color filter array may employ a correction system in order to offset crosstalks by other peripheral pixels. Equation 3 represents an exemplary matrix of the correction system. The diagonal components of the matrix may be used to represent dispersion.

Noise dispersion of a conventional RGB system by Equation 3 may be measured by taking the square root of the sum of squares of the diagonal components. For example, $\sqrt{1.6^2 + 1.5^2 + 2.0^2} = 2.97$.

Noise dispersion of the yellow, green, cyan filter system by Equation 2 measured in the same way may be $\sqrt{1^2 + 1^2 + 1^2} = 1.73$.

Therefore, the noise improvement by a filter system according to an example embodiment over a conventional RGB filter system may be represented as 20 log(2.97/1.73) =4.69 dB.

Figure 20:
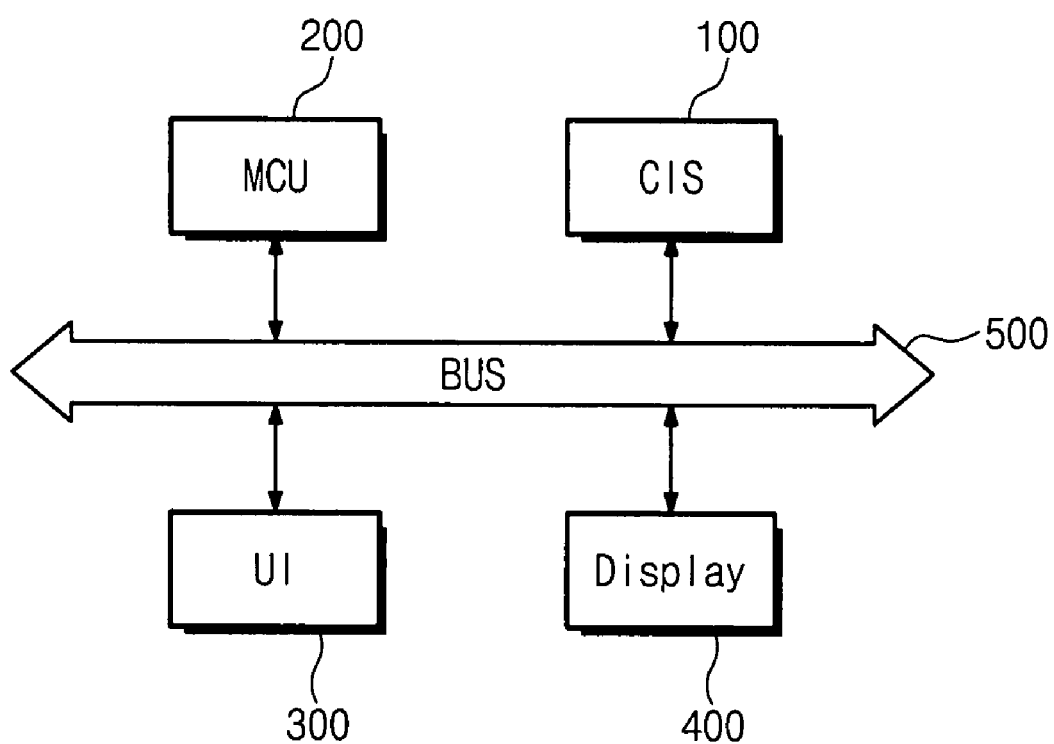
FIG. 20 is a block diagram illustrating a portable camera system including a CIS.

FIG. 20 is a block diagram illustrating a portable camera system including a CIS. According to FIG. 20, the portable camera system may include a CIS 100, a microcontroller unit (MCU) 200, a user interface (UI) 300, a display unit 400, and/or a bus 500. The CIS 100 may be implemented according to an example embodiment.

The CIS according to an example embodiment may reduce effects from crosstalk, and use yellow, green, and cyan filters to improve photosensitivity. Furthermore, example embodiments may provide a color filter array capable of shifting spectrums of yellow and cyan filters through use of compounds of paints and/or dyestuffs in order to enhance photosensitivity of the CIS.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A color filter array of a complementary metal oxide semiconductor (CMOS) image sensor, comprising:
   microlenses configured to condense incident light;

color filters configured to extract colors from light passed through the microlenses; and pixels configured to receive the colors from the color filters;

wherein the color filters include yellow, green, and cyan filters, wherein at least one of the color filters compensates for a wavelength offset in a pixel by shifting a transmission spectrum of the incident light in a direction opposite to the wavelength offset in the pixel due to crosstalk among adjacent pixels, and wherein the at least one of the color filters shifts the transmission spectrum of the incident light by an amount equal in magnitude to the wavelength offset.

2. The color filter array of claim 1, wherein the color filters are disposed in a plurality of color filter units.

3. The color filter array of claim 2, wherein each color filter unit is divided into four sections, with a first section including a yellow filter, a second section including a green filter, a third section including a cyan filter, and a fourth section including another green filter.

4. The color filter array of claim 2, wherein each color filter unit is divided into four sections, with a first section including a green filter, a second section including a cyan filter, a third section including another green filter, and a fourth section including a yellow filter.

5. The color filter array of claim 2, wherein each color filter unit is divided into four sections, with a first section including a cyan filter, a second section including a green filter, a third section including a yellow filter, and a fourth section including another green filter.

6. The color filter array of claim 2, wherein the color filter unit is divided into four sections, with a first section including a green filter, a second section including a yellow filter, a third section including another green filter, and a fourth section including a cyan filter.

7. The color filter array of claim 1, wherein a transmission spectrum of each yellow filter is shifted to offset crosstalk effects from peripheral pixels based on a measured wavelength variation in each yellow pixel.

8. The color filter array of claim 7, wherein the transmission spectrum of each yellow filter is shifted using at least one compound with paints or dyestuffs.

9. The color filter array of claim 1, wherein a transmission spectrum of each cyan filter is shifted to offset crosstalk effects from peripheral pixels based on a measured wavelength variation in each cyan pixel.

10. The color filter array of claim 9, wherein the transmission spectrum of each cyan filter is shifted using at least one compound with paints or dyestuffs.

11. An image sensor including the color filter array of claim 1.

12. A portable camera including the image sensor of claim 11.

13. A method of producing a color filter array, comprising:

evaluating a wavelength offset of a pixel due to crosstalk among adjacent pixels; and compensating for the wavelength offset by shifting a transmission spectrum of incident light of at least one color filter in the color filter array;

wherein the at least one color filter shifts the transmission spectrum in a direction opposite to the wavelength offset, and wherein the at least one color filter shifts the transmission spectrum by an amount equal in magnitude to the wavelength offset.

14. The method of claim 13, wherein compensating for the wavelength offset includes using at least one compound with paints or dyestuffs.

15. A color filter array, comprising:

a plurality of color filters;

wherein each color filter is configured to compensate for a wavelength offset in a pixel, due to crosstalk among adjacent pixels, by shifting a transmission spectrum of incident light, wherein each color filter shifts the transmission spectrum of the incident light in a direction opposite to the wavelength offset, and wherein each color filter shifts the transmission spectrum of the incident light by an amount equal in magnitude to the wavelength offset.

16. The color filter array of claim 15, wherein the transmission spectrum is shifted using paints or dyestuffs.

17. The color filter array of claim 15, wherein the plurality of color filters are arranged in overlapping units, and wherein each unit includes green, yellow, and cyan color filters in a ratio of 2:1:1, respectively.

* * * * *